(12) United States Patent
Marocchini et al.

(10) Patent No.: US 10,082,088 B2
(45) Date of Patent: Sep. 25, 2018

(54) FLEXURE FOR METERING VALVE ASSEMBLY WITH RETAINING FEATURE

(71) Applicant: Hamilton Sundstrand Corporation, Charlotte, NC (US)

(72) Inventors: Francis P. Marocchini, Somers, CT (US); Elise N. Zimmerman, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 560 days.

(21) Appl. No.: 14/596,272

(22) Filed: Jan. 14, 2015

(65) Prior Publication Data

US 2016/0201576 A1     Jul. 14, 2016

(51) Int. Cl.

| | |
|---|---|
| *F02C 7/232* | (2006.01) |
| *F02C 9/32* | (2006.01) |
| *F16K 31/126* | (2006.01) |
| *F02C 7/22* | (2006.01) |
| *F02C 9/26* | (2006.01) |
| *F16K 1/54* | (2006.01) |
| *F23R 3/28* | (2006.01) |
| *F23K 5/14* | (2006.01) |
| *F23N 1/00* | (2006.01) |

(52) U.S. Cl.
CPC ............... *F02C 9/32* (2013.01); *F02C 7/22* (2013.01); *F02C 7/232* (2013.01); *F02C 9/263* (2013.01); *F16K 1/54* (2013.01); *F16K 31/126* (2013.01); *F23K 5/147* (2013.01); *F23N 1/005* (2013.01); *F23R 3/28* (2013.01)

(58) Field of Classification Search
CPC .. F02C 7/22; F02C 7/232; F02C 9/263; F23R 3/28; F16K 1/54

USPC ........................................ 251/120–122, 337
See application file for complete search history.

(56) References Cited

U.S. PATENT DOCUMENTS

| | | | | |
|---|---|---|---|---|
| 3,250,293 | A | * 5/1966 | Adams | ................. G05D 7/0635 137/489 |
| 3,902,315 | A | * 9/1975 | Martin | ..................... F02C 7/26 60/39.091 |
| 3,926,405 | A | * 12/1975 | Arnold | ................ F16K 31/0655 251/129.08 |
| 3,995,660 | A | 12/1976 | Kast | |
| 4,120,230 | A | * 10/1978 | Bunyan | ................... F16B 31/04 254/29 A |
| 4,226,365 | A | 10/1980 | Norris et al. | |
| 4,407,324 | A | * 10/1983 | Caddell | ................... F16K 27/08 137/382 |

(Continued)

OTHER PUBLICATIONS

European Search Report for European Application No. 16150750.4 dated Jun. 2, 2016.

*Primary Examiner* — Gerald L Sung
*Assistant Examiner* — Marc Amar
(74) *Attorney, Agent, or Firm* — Carlson, Gaskey & Olds, P.C.

(57) ABSTRACT

A flexure for a metering valve has a flexure body defining a center axis to be aligned with a fuel nozzle. The flexure body includes an outermost peripheral surface surrounding the center axis. A retaining feature is formed in the flexure body and is configured to mount the flexure body to a metering valve component. The retaining feature is located radially between the center axis and the outmost peripheral surface. A metering valve is also disclosed.

20 Claims, 7 Drawing Sheets

(56) References Cited

U.S. PATENT DOCUMENTS

| | | | |
|---|---|---|---|
| 4,463,332 A * | 7/1984 | Everett | H01F 7/1615 335/258 |
| 4,637,420 A * | 1/1987 | Dyer | F02C 9/263 137/242 |
| 4,751,942 A | 6/1988 | Dyer et al. | |
| 4,838,313 A * | 6/1989 | Kobayashi | G05D 16/2013 137/625.65 |
| 5,116,362 A | 5/1992 | Arline et al. | |
| 5,280,721 A * | 1/1994 | Carson | G01F 1/002 73/216 |
| 5,339,636 A | 8/1994 | Donnelly et al. | |
| 5,407,174 A * | 4/1995 | Kumar | H01F 7/1607 251/129.08 |
| 5,513,493 A | 5/1996 | Severn et al. | |
| 5,896,737 A | 4/1999 | Dyer | |
| 6,390,129 B2 * | 5/2002 | Jansen | F15B 13/0402 137/625.65 |
| 6,401,749 B1 * | 6/2002 | Tai | F16K 15/021 137/514 |
| 6,443,183 B1 * | 9/2002 | Roorda | F16F 1/027 137/529 |
| 6,918,569 B2 | 7/2005 | Jansen | |
| 7,004,449 B2 | 2/2006 | Jansen | |
| 7,409,855 B2 | 8/2008 | Flint | |
| 7,984,728 B2 * | 7/2011 | Wynn, Jr. | F02M 69/54 137/539 |
| 8,176,897 B1 * | 5/2012 | Guglielmo | F02D 19/027 123/458 |
| 8,720,482 B2 | 5/2014 | Griffiths | |
| 2001/0002041 A1 * | 5/2001 | Hayakawa | F16K 1/36 251/129.15 |
| 2003/0168619 A1 * | 9/2003 | Jansen | F16K 31/10 251/129.07 |
| 2013/0306894 A1 * | 11/2013 | Wei | F16K 25/00 251/129.15 |

* cited by examiner

FLEXURE FOR METERING VALVE ASSEMBLY WITH RETAINING FEATURE

BACKGROUND OF THE INVENTION

The present invention generally relates to a metering valve assembly for a gas turbine engine that includes a flexure that provides a desired spring force, as well as providing adjustability and centering capabilities, and which is easily packaged within the tight design constraints that are required for more efficient engine configurations.

Gas turbine engines include a compressor to pressurize an airflow, a combustor for burning fuel in the presence of the pressurized air, and a turbine that extracts energy from the resultant combustion gases. The combustor includes radially spaced inner and outer liners that define an annular combustion chamber therebetween. A plurality of circumferentially distributed fuel nozzles project symmetrically into a forward section of the combustion chamber through a respective fuel nozzle guide to supply the fuel to be mixed with the pressurized air.

It is desirable to ignite the fuel quickly and smoothly under all operating conditions to maintain the desired level of fuel efficiency. In one example, a single metering valve is used to supply fuel to all of the fuel nozzles. With this configuration it is difficult to maintain a controlled and uniform burn under all operating configurations.

SUMMARY OF THE INVENTION

A flexure for a metering valve has a flexure body defining a center axis to be aligned with a fuel nozzle. The flexure body includes an outermost peripheral surface surrounding the center axis. A retaining feature is formed in the flexure body and is configured to mount the flexure body to a metering valve component. The retaining feature is located radially between the center axis and the outmost peripheral surface. A metering valve is also disclosed.

These and other features of the present invention can be best understood from the following specification and drawings, the following of which is a brief description.

DETAILED DESCRIPTION

Figure 1:
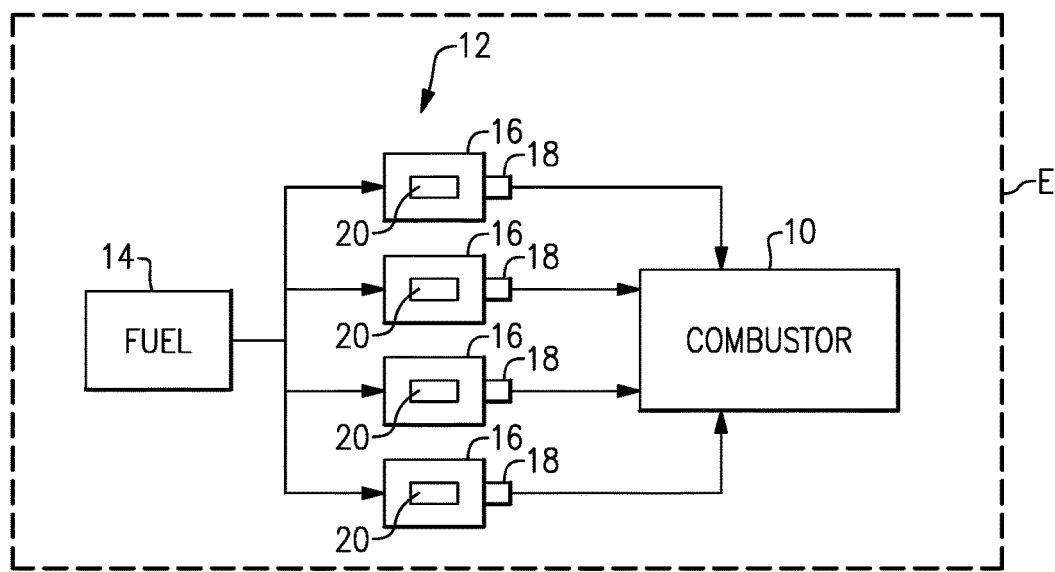
FIG. 1 shows a schematic representation of a combustor for a gas turbine engine.

FIG. 1 shows a schematic representation of a combustor 10 for a gas turbine engine E. As known, a plurality of nozzle assemblies 12 is circumferentially spaced about an engine axis to deliver fuel from a fuel supply system 14 to the combustor 10. Each nozzle assembly 12 includes a housing 16 and a nozzle 18 that sprays fuel into the combustor 10. The subject invention provides a metering valve 20 in each housing 16 to independently control the fuel supply at each nozzle location.

Figure 2:
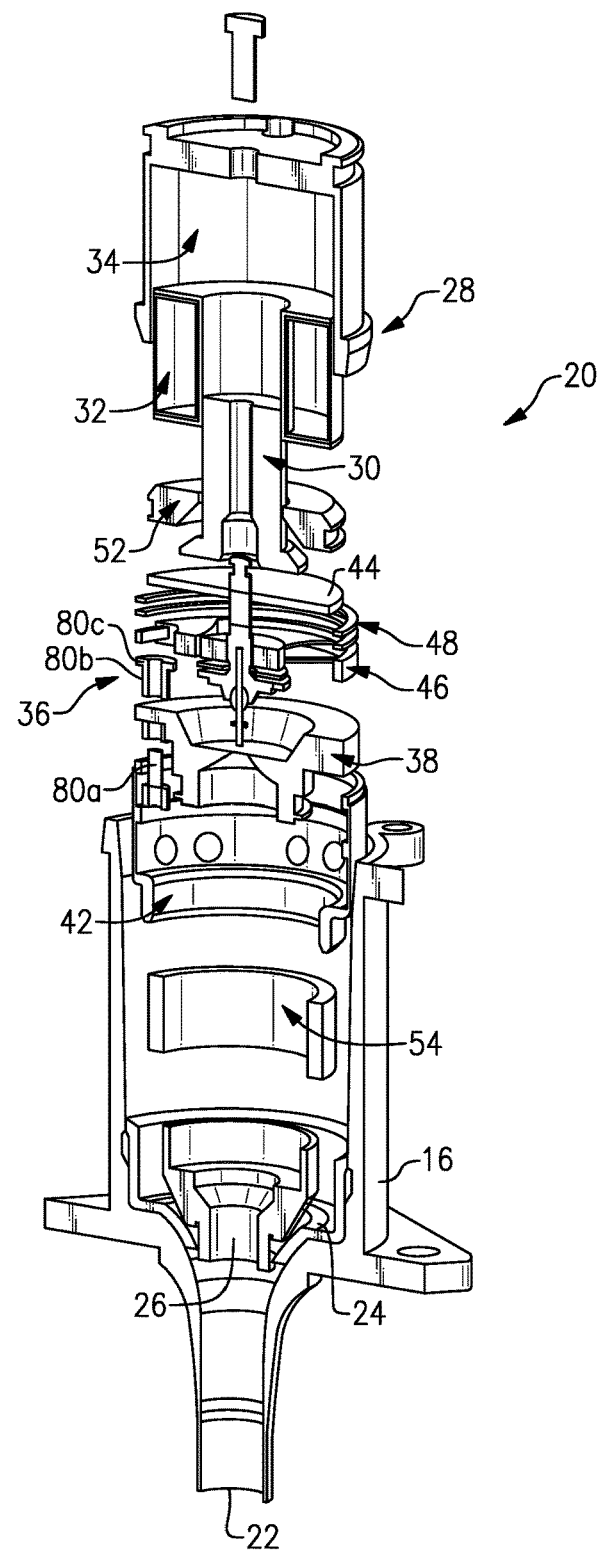
FIG. 2 shows an exploded view of a nozzle and metering valve assembly as used in the combustor of FIG. 1.

As shown in FIG. 2, the metering valve 20 includes the nozzle housing 16 which has an outlet 22 configured to direct fuel into the combustor 10. A first housing sub-component 24 is seated in the housing 16 at the outlet 22 and a second housing sub-component 26 is seated within the first housing sub-component 24.

A motor 28 is received within the housing 16. In one example, the motor 28 comprises a solenoid that includes a core 30 surrounded by a coil 32 and a cover 34 that encloses the core 30 and coil 32. The cover 34 is enclosed within the housing 16.

A valve assembly 36 is actuated by the motor 28 to deliver fuel to the outlet 22 of the housing 16. The valve assembly 36 is shown in greater detail in the magnified view of FIG. 3. The valve assembly 36 includes a base plate 38 having a first portion 38a that extends into the second housing sub-component 26 (FIG. 2) and a second portion 38b that forms an outwardly extending flange. A center opening 40 is formed within the base plate 38 that is in fluid communication with the nozzle assembly 12 and defines a nozzle axis A. The nozzle assembly 12 includes a ball bearing, bellows, nozzle, and valve flow deflector as known. A solenoid side wall structure 42 surrounds the base plate 38 and nozzle assembly 12. The nozzle assembly 12 is coupled to a plunger 44 that is configured to be magnetically attracted toward the core 30 and coil 32 when the solenoid is energized.

One or more flexures 46 are used in the metering valve 20 to provide a spring force that resists the magnetic attraction of the plunger 44. A first set of shims 48 are installed within the assembly to properly locate the plunger 44 relative to the solenoid sidewall 42. A second set of shims 50 are installed within the assembly to set the flexure(s) 46 preload for ball and seat sealing 56, 58. A spacer 52 (FIG. 2) is installed axially between the coil 32 and the plunger 44 and serves as a max stop of the solenoid. A locking ring 54 is installed radially between the baseplate 38 and the retaining fingers to secure and retain the assembly 200.

Figure 4:
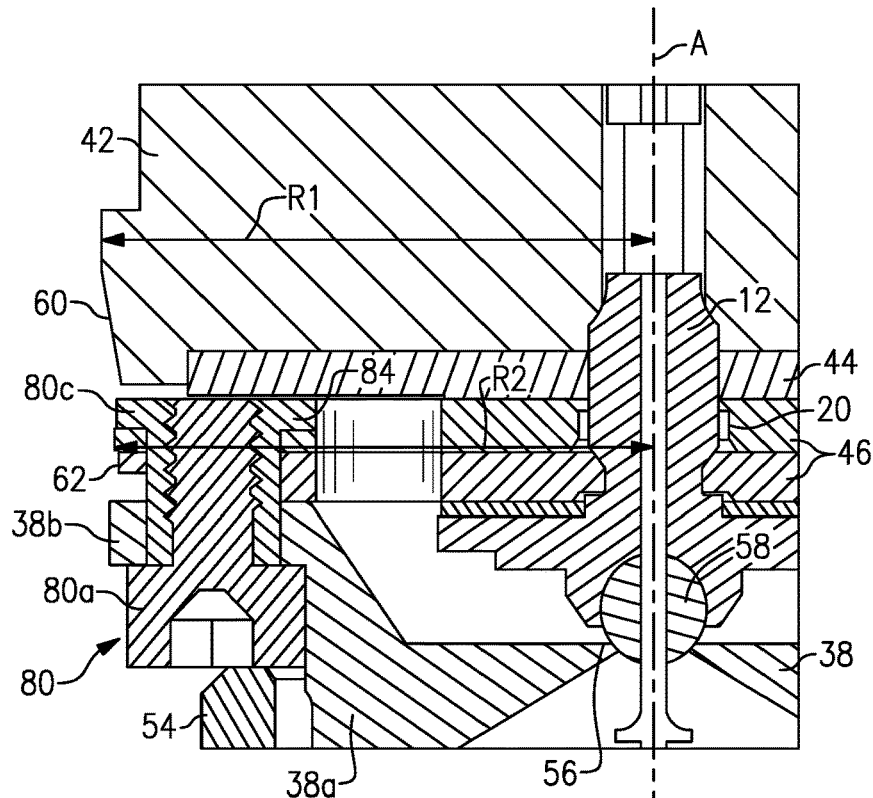
FIG. 4 is a partial, cross-sectional view of the nozzle and metering valve assembly of FIG. 2.

As shown in the section view of FIG. 4, the center opening 40 of the base plate 38 provides a seat 56 for the valve assembly 36. The valve assembly 36 includes a ball 58 that moves out of engagement with the seat 56 when the plunger 44 is actuated to move upwardly as viewed in FIG. 4. When not actuated by the motor 28, the spring force of the flexure 46 returns the ball 58 to the seated position.

As shown in FIG. 4, the motor 28 has an outer peripheral surface 60 that is defined by a first radial dimension R1 relative to the nozzle center axis A. The flexure 46 includes an outermost peripheral surface 62 that surrounds the center axis A and which is defined by a second radial dimension R2 that is equal or less than the first radial dimension R1. This allows the metering valve 20 to be easily packaged within existing nozzle housing 16 without having to increase the size of the housing. This will be discussed in greater detail below.

Figure 5:
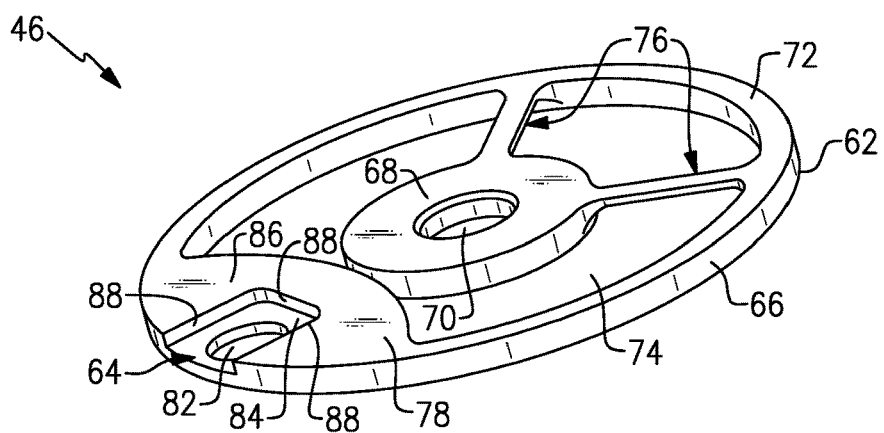
FIG. 5 shows a top perspective view of a flexure as used in the nozzle and metering valve assembly of FIG. 2.
Figure 6:
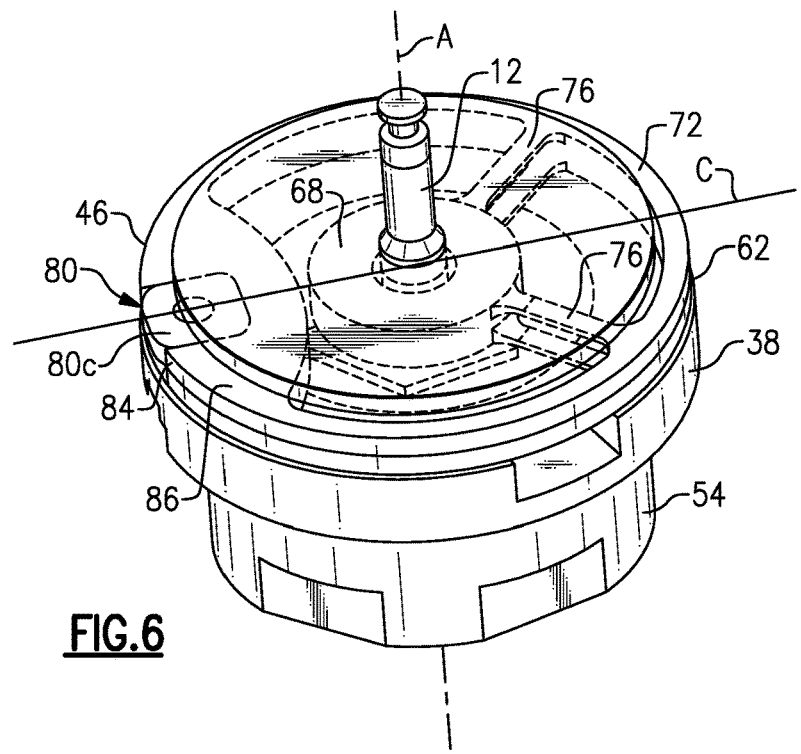
FIG. 6 shows a top perspective view of a locking ring, base plate and flexure assembly of the nozzle and metering valve assembly of FIG. 2.
Figure 7:
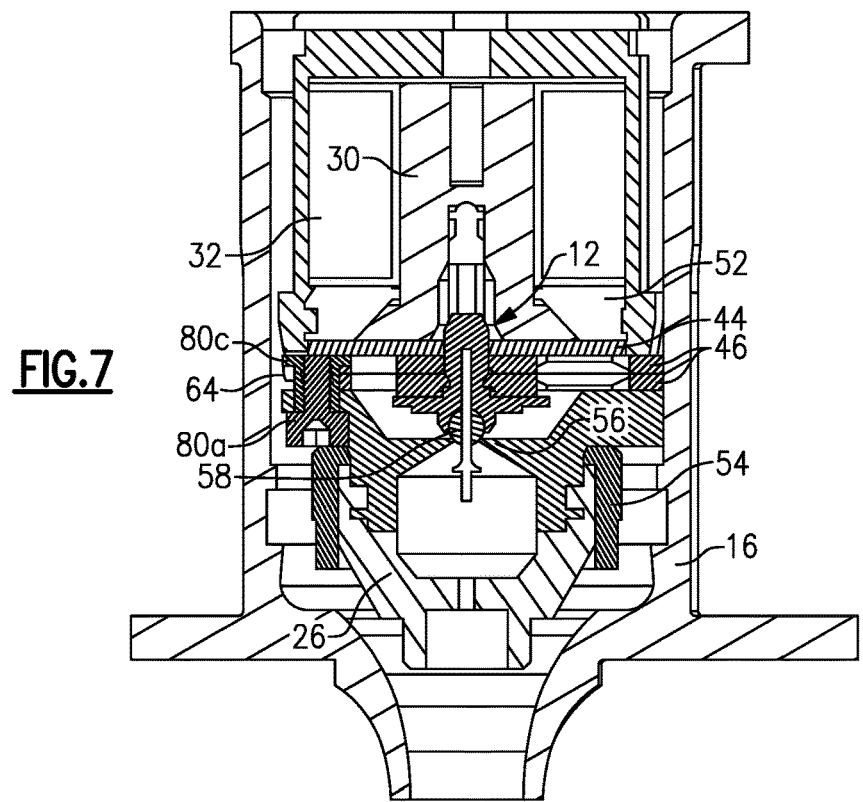
FIG. 7 is a cross-sectional view of the assembled nozzle and metering valve assembly of FIG. 2.

The flexure 46 is shown in greater detail in FIGS. 5-7. The flexure 46 includes a unique retaining feature 64 formed in a flexure body 66. The retaining feature 64 is located radially between the center axis A and the outmost peripheral surface 62. The flexure body 66 includes a first body portion 68 that provides an opening 70 for the nozzle assembly 12 and a second body portion 72 spaced radially outwardly from the first body portion 68 by a gap 74 such that a significant amount of the area between the portions 68, 72 is open. The second body portion 72 defines the outermost peripheral surface 62. At least two arms 76 extend radially outwardly from the first body portion 68 to the second body portion 72.

In one example, the arms 76 are spaced apart from each other by approximately ninety degrees.

In one example, the first body portion 68 comprises a first ring and the second body portion 72 comprises a second ring that surrounds the first ring. The rings are concentric with the axis A and the arms 76 extend radially outwardly to connect the rings.

The flexure body 66 includes a third body portion 78 that extends radially inwardly from the second body portion 72 toward the first body portion 68. In one example, the third body portion 78 does not contact the first body portion 68. The third body portion 78 includes the retaining feature 64. The retaining feature 64 is circumferentially spaced apart from each of the arms 76. In one example, the retaining feature 64 is positioned approximately one hundred and eighty degrees from the center point C (FIG. 6) on the second body portion 72 of the space between the arms 76.

In one example, the retaining feature 64 comprises a mount interface for a fastener 80. The third body portion 78 includes an anti-rotation feature to prevent the fastener 80 from rotating relative to the flexure body 66 once the flexure 46 is installed within the metering valve 20. The third body portion 78 includes an opening 82 configured to receive the fastener 80. The anti-rotation feature comprises a recessed area 84 formed within an upper surface 86 of the third body portion 78 and which surrounds the opening 82. The recessed area 84 is configured to receive an enlarged portion of the fastener 80. The recessed area 84 is defined by at least two side walls 88 which cooperate with the enlarged portion of the fastener 80 to prevent rotation. Thus, only a single fastener is required as a retention feature.

Figure 3:
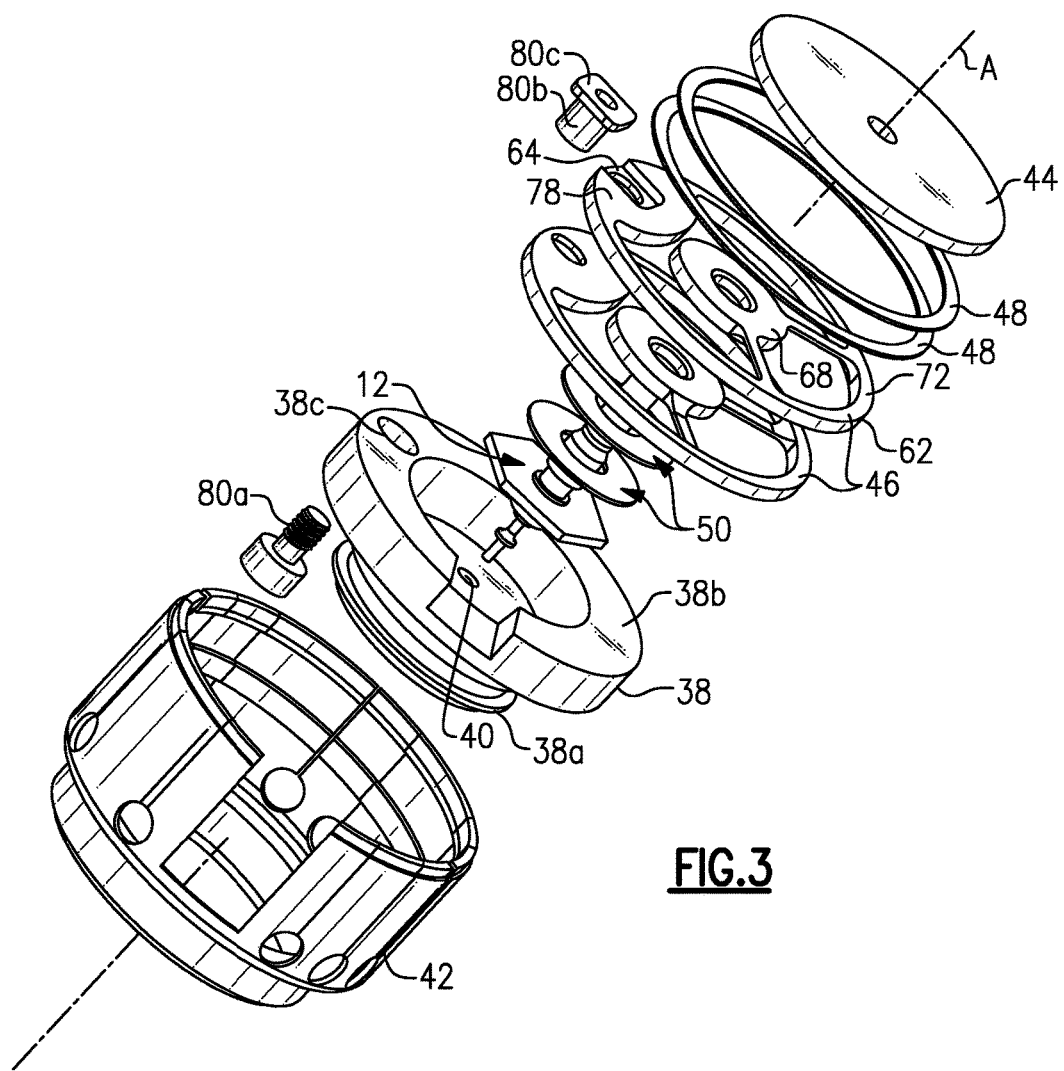
FIG. 3 shows a magnified view of a portion of the nozzle and metering valve assembly of FIG. 2.

In one example, the fastener 80 comprises a modified sex bolt with a first fastener portion 80a and a second fastener portion 80b (FIG. 3). The second fastener portion 80b of the sex bolt is configured to comprise a nut portion with a rectangular head 80c, which acts as an anti-rotation feature when located within the recessed area 84. In one example, the recessed area 84 is configured to have a polygonal shape that corresponds to the second fastener portion 80b. The recessed area 84 not only provides anti-rotation, but also provides clearance to prevent interaction with the plunger operation as the head 80c of the second fastener portion 80b does not extend outwardly of an uppermost surface of the flexure 46. Also, the flexure 46 provides adjustability between the ball 58 and seat 56 to always provide a completely sealed configuration. This adjustability is controlled by a diametrical clearance between an outer diameter of the second fastener portion 80b and an inner diameter of the opening 82, plus the outer diameter of second fastener portion 80b and the inner diameter of the baseplate 38c The location of the retaining feature 64 within an envelope defined by the solenoid body provides a very compact configuration from a packaging perspective but does not interfere with the functions provided by the flexure 46. As discussed above, the flexure 46 provides the spring force to counter the magnetic attraction of the plunger 44. The flexure 46 also serves to center the plunger 44 to prevent grounding to the solenoid side walls 42. The centering function is provided by the arms 76 which hold the flexure rigid in a radial direction relative to the axis A. Further, the flexure 46 provides adjustability for proper sealing between the ball 58 and seat 56. All of these functions are imperative to ensure proper performance of the metering valve 20.

Figure 9:
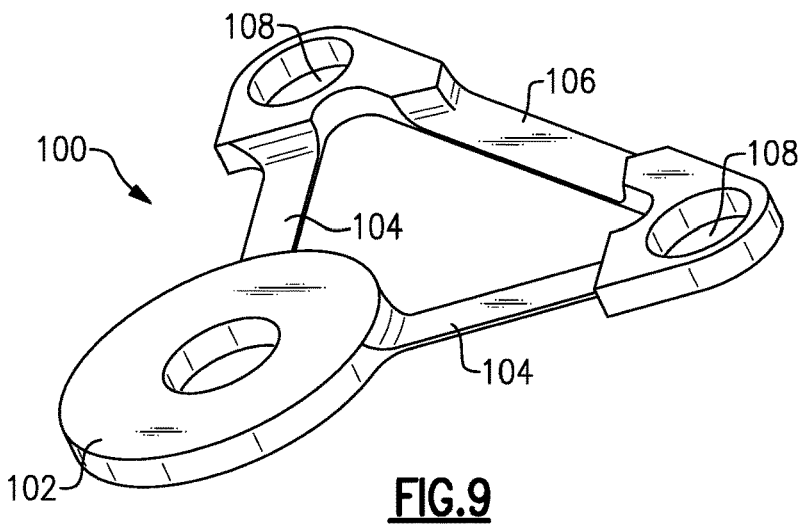
FIG. 9 shows a prior art flexure
Figure 10:
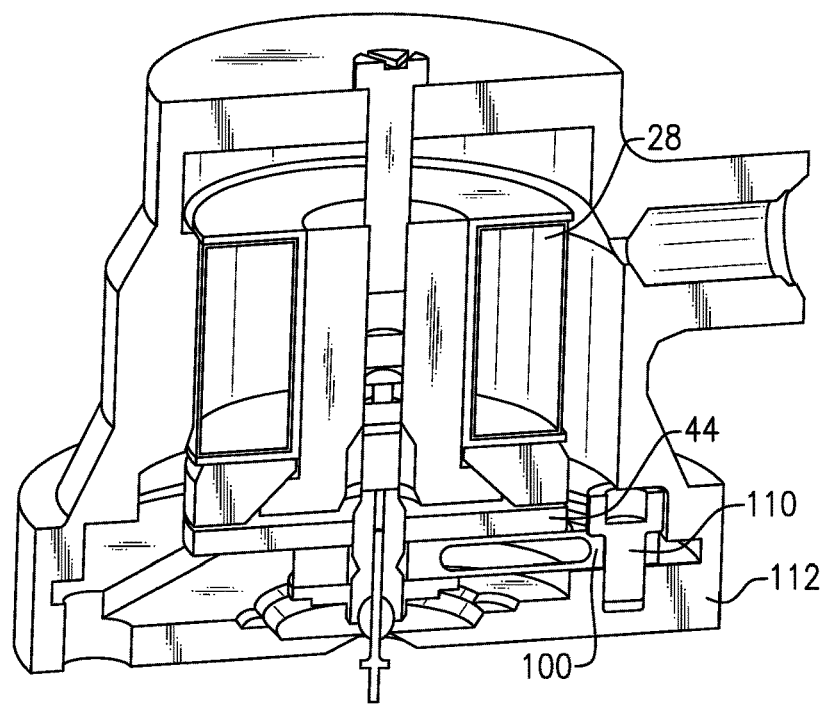
FIG. 10 shows the prior art flexure of FIG. 9 as installed in a nozzle housing.

In a prior known configuration shown in FIGS. 9-10, a flexure 100 comprised a triangular shaped body having a center portion 102 for the nozzle assembly 12, and two arms 104 extending from the center portion 102 to provide an attachment interface. A bridge 106 extended between the arms to form the triangle shape. Each arm 104 included a hole 108 to receive a fastener 110 (FIG. 10).

In this known configuration, the flexure retention at 110 is located radially outward of the plunger 44 and solenoid motor 28 to prevent interference with the plunger 44 and to provide the desired adjustability. However, this radial extension of the flexure retention is unacceptable from a packaging perspective as it requires a modified nozzle housing 112. As such, this existing configuration is too big and heavy to be utilized within the combustor described above.

The subject invention provides a compact solution by minimizing the packaging to the smallest capability. A significant reduction in the radial package is provided without limitation of the required functionality as the flexure retaining feature 64 is now moved to within the radial confines of the solenoid body. Further, the flexure 46 includes an anti-rotation feature and provides clearance to prevent interaction with plunger operation. Finally, sealing adjustability is also maintained is now controlled by the diametrical clearance between the fastener and the fastener hole.

Figure 8:
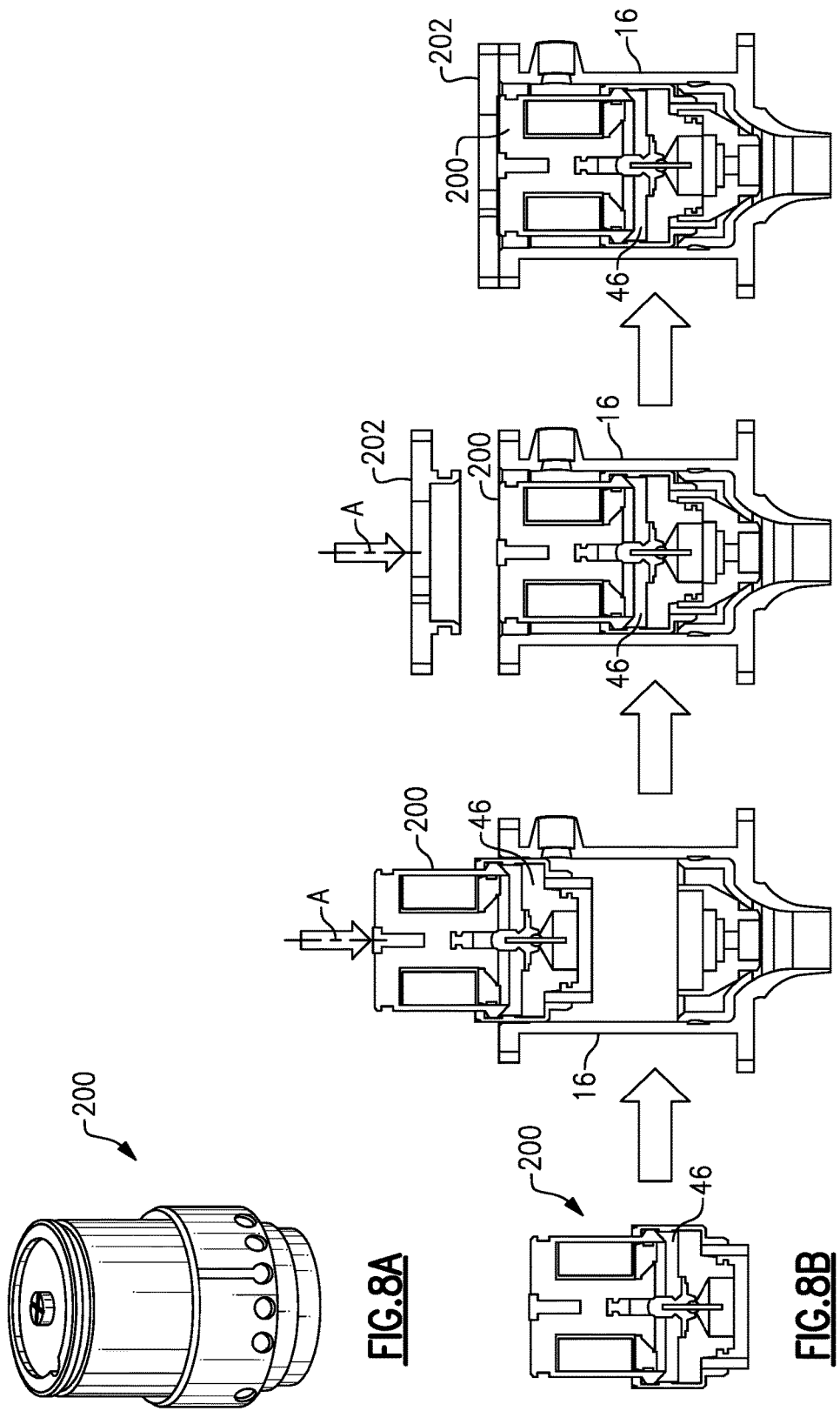
FIG. 8A shows a metering valve assembly prior to installation in a nozzle housing.
FIG. 8B shows a first step of installing the metering valve assembly into the nozzle housing.
FIG. 8C shows a subsequent step of installing the metering valve assembly into the nozzle housing.
FIG. 8D shows subsequent step of installing the metering valve assembly into the nozzle housing.
FIG. 8E shows the metering valve assembly as assembled into the nozzle housing.

Installation of the subject metering valve 20 in an existing nozzle housing 16 is shown in FIGS. 8A-8E. FIG. 8A shows an assembled solenoid and valve assembly 200. FIG. 8B shows a section view of the assembly 200 and shows the position of the flexure 46. The assembly 200 is inserted into the nozzle housing 16 in a direction along the center axis A, as shown in FIG. 8C. A housing cover 202 is then installed to completely enclose the assembly 200 within the housing 16 as shown in FIGS. 8D-8E. As shown, no portion of the flexure 46 extends outwardly of an envelope defined by the assembly 200.

The incorporation of this invention into the metering valve provides a compact and light weight solution such that each nozzle will have independent fuel metering. This can greatly advance the engine combustion technology and performance. Independent fuel modulation at the combustor has monumental effects on combustion technology. Some primary advantages include fuel efficiency, thermal management of combustor hardware, and engine acoustic control.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The invention claimed is:

1. A flexure for a metering valve comprising:
a flexure body defining a center axis, the flexure body including an outermost peripheral surface completely surrounding the center axis, and wherein the flexure body includes a first body portion providing a fuel nozzle opening to be aligned with a fuel outlet, a second body portion spaced radially outwardly from the first body portion by a gap, the second body portion defining the outermost peripheral surface and including an inner peripheral surface, and further including a third body portion that extends radially inwardly from the inner peripheral surface of the second body portion toward the first body portion and at least two arms extending radially outwardly from the first body portion to the second body portion; and
a retaining feature formed in the third body portion of the flexure body and configured to mount the flexure body to a metering valve component, the retaining feature being located radially between the center axis and the outmost peripheral surface.

2. The flexure according to claim 1 wherein the arms are spaced apart from each other by approximately ninety degrees.

3. The flexure according to claim 1 wherein the first body portion comprises a first ring and the second body portion comprises a second ring that surrounds the first ring.

4. The flexure according to claim 1 wherein the third body portion extends radially inwardly from the inner peripheral surface of the second body portion and does not contact the first body portion.

5. The flexure according to claim 4 wherein the retaining feature is circumferentially spaced apart from each of the at least two arms.

6. The flexure according to claim 5 wherein the retaining feature comprises a mount interface for a fastener.

7. The flexure according to claim 6 wherein the third body portion includes an anti-rotation feature to prevent the fastener from rotating relative to the flexure body once the flexure is installed within the metering valve.

8. The flexure according to claim 7 wherein the third body portion includes an opening configured to receive the fastener, and wherein the anti-rotation feature comprises a recessed area formed within an upper surface of the third body portion and which surrounds the opening, the recessed area configured to receive a nut for the fastener.

9. The flexure according to claim 8 wherein the recessed area is defined by at least two side walls.

10. The flexure according to claim 1 wherein the third body portion includes an opening that receives a fastener, and wherein only a single fastener is required as the retaining feature for the flexure body.

11. The flexure according to claim 1 wherein the third body portion includes an opening that receives a fastener, and including a recessed area formed within an upper surface of the third body portion and which surrounds the opening, the recessed area configured to receive a nut for the fastener, and wherein the recessed area comprises an anti-rotation feature and a clearance feature such that the nut does not extend outwardly of the upper surface of the third body portion.

12. A metering valve for a combustor in a gas turbine engine comprising:
a nozzle housing having a combustor fuel outlet;
an actuator received within the nozzle housing, the actuator defining an outer peripheral surface;
a valve assembly to be actuated by the actuator;
a fuel nozzle configured to receive fuel from the valve assembly;
at least one flexure associated with the valve assembly, the flexure defining a center axis to be aligned with the fuel nozzle, and wherein the flexure includes a first body portion providing a fuel nozzle opening and a second body portion spaced radially outwardly from the first body portion by a gap, the second body portion defining an outermost peripheral surface that completely surrounds the center axis and including an inner peripheral surface, and further including a third body portion that extends radially inwardly from the inner peripheral surface of the second body portion toward the first body portion; and
wherein the outer peripheral surface of the actuator is defined by a first radial dimension, and wherein the outermost peripheral surface of the flexure is defined by a second radial dimension that is equal or less than the first radial dimension.

13. The metering valve according to claim 12 wherein the flexure includes a retaining feature configured to mount the flexure to the valve assembly, the retaining feature being located radially between the center axis and the outmost peripheral surface.

14. The metering valve according to claim 13 wherein the third body portion includes the retaining feature which extends radially inwardly of the inner peripheral surface of the second body portion.

15. The metering valve according to claim 14 further including at least two arms extending radially outwardly from the first body portion to the second body portion, and wherein the retaining feature is circumferentially spaced apart from each of the at least two arms.

16. The metering valve according to claim 14 wherein the third body portion includes an opening that receives a fastener, and including a recessed area formed within an upper surface of the third body portion and which surrounds the opening, the recessed area configured to receive a nut for the fastener, and wherein the recessed area comprises an anti-rotation feature.

17. The metering valve according to claim 15 wherein the arms are spaced apart from each other by approximately ninety degrees and wherein the retaining feature is positioned on an opposite side of the first body portion from the arms.

18. The metering valve according to claim 14 wherein the third body portion includes an opening that receives a fastener, and wherein only a single fastener is required as the retaining feature.

19. The metering valve according to claim 12 including a base plate having a first portion that extends into a housing sub-component and a second portion that forms an outwardly extending flange, a solenoid including a side wall structure that surrounds the base plate, and a plunger that is configured to be magnetically attracted toward a core and coil when the solenoid is energized, and wherein the flexure is positioned axially between the base plate and the plunger.

20. The metering valve according to claim 16 wherein the recessed area comprises a clearance feature such that the nut does not extend outwardly of the upper surface of the third body portion.

\* \* \* \* \*